United States Patent
Moon et al.

(10) Patent No.: US 9,900,486 B2
(45) Date of Patent: Feb. 20, 2018

(54) OPTICAL DEVICE

(71) Applicant: Samsung Electronics Co., Ltd., Gyeonggi-do (KR)

(72) Inventors: Chan-Young Moon, Yongin-si (KR);
Jin-Young Bang, Gyeonggi-do (KR);
Jin-Heon Oh, Gyeonggi-do (KR);
Jong-Hyeok Chun, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 25 days.

(21) Appl. No.: 15/084,011

(22) Filed: Mar. 29, 2016

(65) Prior Publication Data

US 2016/0320586 A1  Nov. 3, 2016

(30) Foreign Application Priority Data

Apr. 30, 2015  (KR) .......................... 10-2015-0061686

(51) Int. Cl.

| | |
|---|---|
| *G02B 15/14* | (2006.01) |
| *H04N 5/225* | (2006.01) |
| *G02B 7/10* | (2006.01) |
| *G03B 13/36* | (2006.01) |
| *G02B 7/08* | (2006.01) |
| *H04N 5/232* | (2006.01) |

(52) U.S. Cl.
CPC ............. *H04N 5/2257* (2013.01); *G02B 7/08* (2013.01); *G02B 7/10* (2013.01); *G03B 13/36* (2013.01); *H04N 5/23212* (2013.01)

(58) Field of Classification Search
CPC ...................................................... H04N 5/2257
USPC .......................................................... 359/698
See application file for complete search history.

(56) References Cited

U.S. PATENT DOCUMENTS

| | | | |
|---|---|---|---|
| 6,819,500 B2 | 11/2004 | Tsuzuki | |
| 6,856,469 B2 | 2/2005 | Yoneyama et al. | |
| 7,233,449 B2 | 6/2007 | Suemori et al. | |
| 7,298,562 B2 * | 11/2007 | Sue .......................... | G03B 3/10 359/819 |
| 8,863,913 B2 | 10/2014 | Jang et al. | |
| 2008/0284255 A1 * | 11/2008 | Liu ..................... | H02K 41/0356 310/12.16 |
| 2012/0121246 A1 | 5/2012 | Cho et al. | |

(Continued)

FOREIGN PATENT DOCUMENTS

| | | |
|---|---|---|
| KR | 10-2012-0052453 A | 5/2012 |
| KR | 10-2012-0067169 A | 6/2012 |

*Primary Examiner* — James Jones

(57) ABSTRACT

An optical device includes a lens assembly that performs a forward/backward movement in an optical axis direction. The optical device also includes at least one first driving device that generates a first driving force that causes the lens assembly to perform the forward/backward movement in the optical axis direction. The optical device further includes at least one second driving device that generates a second driving force in a direction that is opposite to the moving direction of the lens assembly. The second driving force may be formed to be equal to or smaller than the first driving force so that the reciprocating amplitude of the lens assembly may be reduced when the lens assembly reciprocates before and after the focusing position. The optical device as described above may be variously implemented according to embodiments.

14 Claims, 10 Drawing Sheets

(56) References Cited

U.S. PATENT DOCUMENTS

2012/0153110 A1    6/2012  Jang et al.
2015/0062408 A1*  3/2015  Yano ........................ G03B 3/10
                                                348/335

* cited by examiner

OPTICAL DEVICE

CROSS-REFERENCE TO RELATED APPLICATION AND CLAIM OF PRIORITY

The present application is related to and claims benefit under 35 U.S.C. § 119(a) to Korean Application Serial No. 10-2015-0061686, which was filed in the Korean Intellectual Property Office on Apr. 30, 2015, the entire content of which is hereby incorporated by reference.

TECHNICAL FIELD

Various embodiments of the present disclosure relate to an optical device. For example, various embodiments of the present disclosure relate to a lens assembly for an imaging device.

BACKGROUND

With the advancement of digital camera manufacturing techniques, electronic devices, which are equipped with a miniaturized and lightweight camera module (e.g., mobile communication terminals), have already been commercialized, and have gradually made inroads into the compact digital camera market. As a mobile communication terminal, which is generally carried by a user, is equipped with a camera module, the user may easily use various functions (e.g., a video call function and an augmented reality function) as well as the function of photographing a still image or a moving image.

As it has become common to mount a camera module to an electronic device, efforts are now being made to improve the performance of the camera module (e.g., image quality) while miniaturizing the camera module. A technique to improve the performance of the camera module includes, for example, an automatic focusing function. The automatic focusing function refers to a function of moving a lens, which is positioned in front of an image sensor, or the image sensor along an optical axis direction depending on a distance to a subject. The automatic focusing function allows a clear image to be obtained on an imaging face of the image sensor. While the automatic focusing function has been equipped in camera modules of high-priced electronic devices, the automatic focusing function has now become an essential function that is mounted to the camera module of inexpensive popular electronic devices.

SUMMARY

In order to implement a zoom-in/zoom-out operation as well as a focusing function, one or more lenses or a lens assembly may be allowed to move forward/backward in an optical axis direction within an optical device. For the forward/backward movement of the lenses or the lens assembly, the optical device may require a driving device, such as a step motor, a piezoelectric motor, or a voice coil motor. A driving device that uses the step motor or the piezoelectric motor may easily control the position of the lenses (or the lens assembly) so that the focusing operation can be quickly performed. On the contrary, the voice coil motor is driven by an electromagnetic force in a state where the lens assembly freely performs the forward/backward movement. After the lens assembly starts to move, the lens assembly may not be stopped at a predetermined position due to inertia even though the operation of the voice coil motor is stopped. For example, in a focusing method that uses the electromagnetic force, the lens assembly may gradually converge on a focused position while reciprocating before and after the focused position.

Accordingly, as compared to the method of using the step motor or the piezoelectric motor, the focusing method of using an electromagnetic force may require a longer time from the time point at which the voice coil motor is driven to the time point at which the focusing is finished. When the time that is required for focusing increases, it may be difficult to secure the photographed image quality of a moving subject. Moreover, when the time that is required for focusing increases, even though the initially photographed image in a continuous photographing method of taking several photographs within a short time (e.g., 1 to 3 seconds) is of a good quality, the continuous photographing speed may be reduced, or it may be difficult to ensure the quality of the subsequently photographed images.

To address the above-discussed deficiencies, it is a primary object to provide an optical device that is capable of reducing the focusing time while using a voice coil motor.

According to various embodiments, there is provided an optical device that includes: a lens assembly that performs a forward/backward movement in an optical axis direction; at least one first driving device that generates a first driving force that causes the lens assembly to perform the forward/backward movement in the optical axis direction; and at least one second driving device that generates a second driving force in a direction that is opposite to the moving direction of the lens assembly.

The second driving force may be formed to be equal to or smaller than the first driving force so that the reciprocating amplitude of the lens assembly may be reduced when the lens assembly reciprocates before and after the focused position.

The second driving device may be operated when the lens assembly performs the forward/backward movement by the first driving force.

According to various embodiments, the optical device includes: a first driving device that performs a focusing operation by using a voice coil motor, and generates a driving device of moving the lens assembly to the target point (the focused point); and a second driving device that generates a driving force in a direction that is opposite to the driving force of the first driving device. Therefore, it is possible to reduce the time that is required for the focusing operation. For example, the second driving device is operated to generate a driving force in the opposite direction when the lens assembly reaches the target point. Therefore, even if the lens assembly overruns beyond the target point by, for example, inertia, the distance can be reduced. In addition, when the lens assembly reciprocates before and after the focused position, the second driving device generates the driving device in the direction that is opposite to the moving direction of the lens assembly. Therefore, it is possible to reduce the reciprocating amplitude of the lens assembly. Accordingly, the optical device according to various embodiments of the present disclosure can reduce the time that is required for focusing by including the second driving device, and can secure a good quality image when photographing a moving subject or performing a continuous photographing operation.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
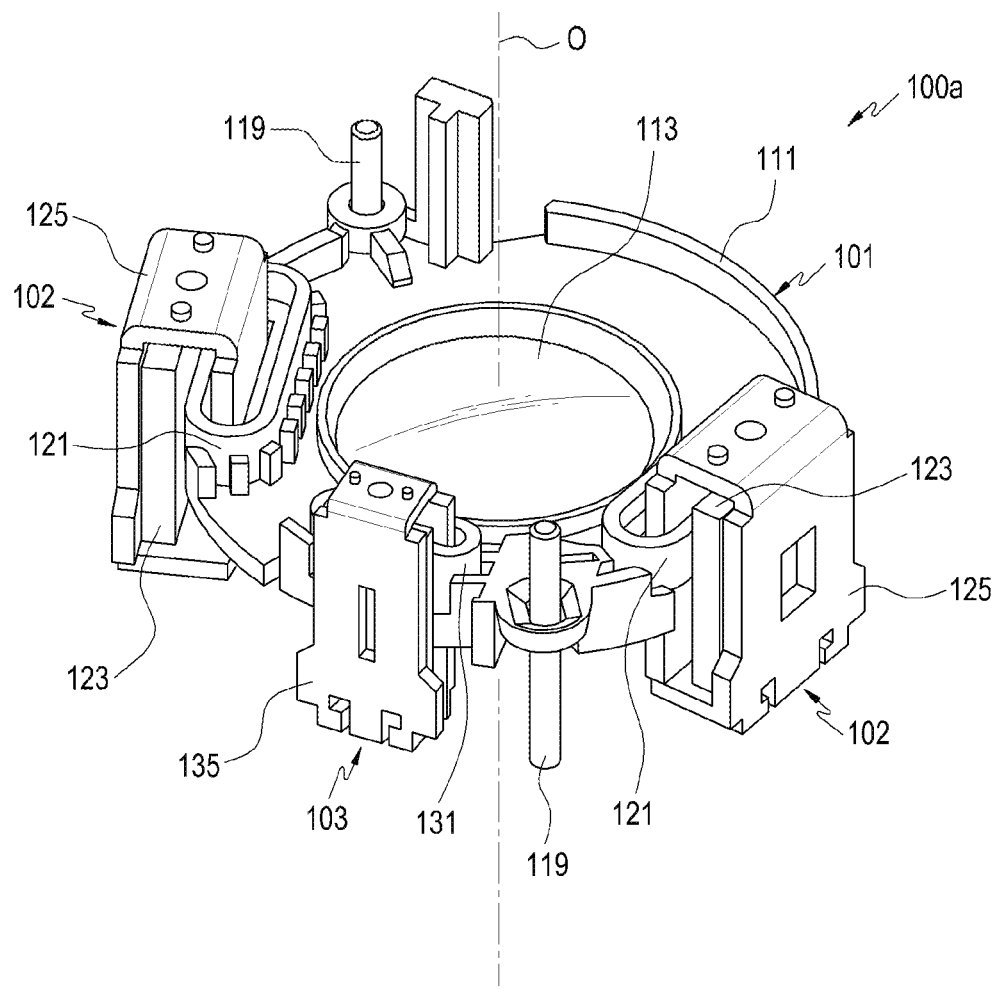
FIG. 1 is a perspective view illustrating a main portion of an optical device according to a first one of various embodiments of the present disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device or system. Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

In the present disclosure, the terms are used to describe specific embodiments, and are not intended to limit the present disclosure. As used herein, the singular forms are intended to include the plural forms as well, unless the context clearly indicates otherwise. In the description, it should be understood that the terms "include" or "have" indicate existence of a feature, a number, a step, an operation, a structural element, parts, or a combination thereof, and do not previously exclude the existences or probability of addition of one or more another features, numeral, steps, operations, structural elements, parts, or combinations thereof.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present specification. In some cases, even the term defined in the present disclosure should not be interpreted to exclude embodiments of the present disclosure.

Figure 2:
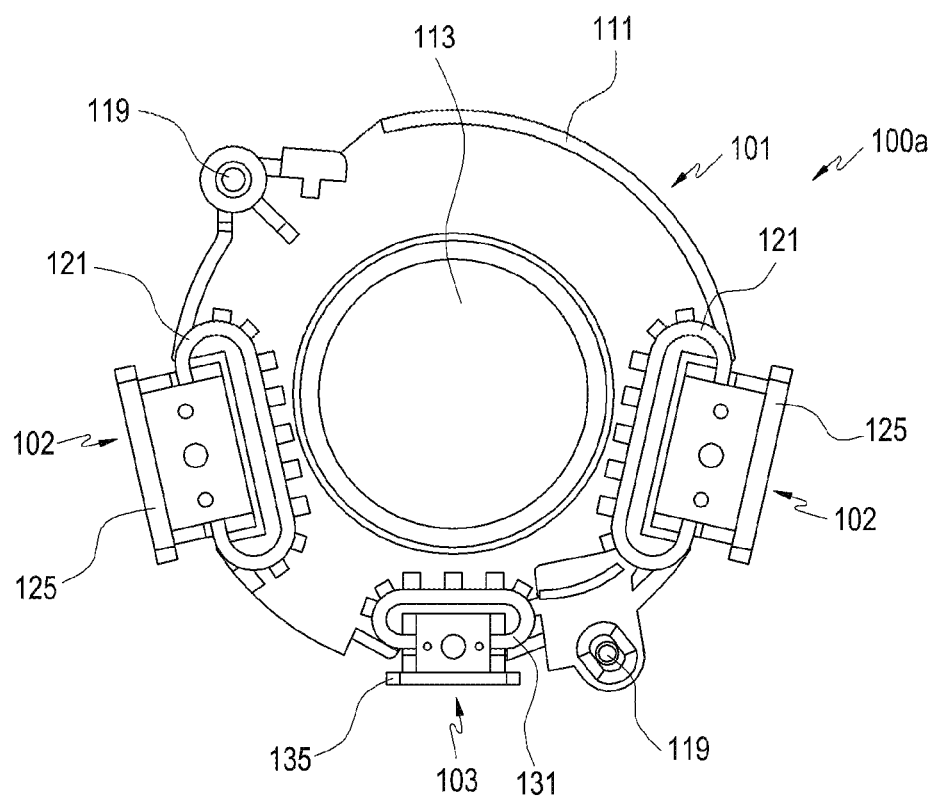
FIG. 2 is a plan view illustrating the main portion of the optical device according to the first one of various embodiments of the present disclosure.

FIG. 1 is a perspective view illustrating a main portion of an optical device 100a according to a first one of various embodiments of the present disclosure. FIG. 2 is a plan view illustrating the main portion of the optical device 100a according to the first one of various embodiments of the present disclosure.

Referring to FIGS. 1 and 2, the optical device 100a may include a lens assembly 101 and first and second driving devices 102 and 103.

The lens assembly 101 may include a guide member 111, to which at least one lens 113 is fixed. Depending on the number of fixed lenses, at least a portion of the guide member 111 may have a cylindrical shape. The specific embodiment of the present disclosure exemplifies a structure in which the guide member 111 has a substantially circular flat plate shape in order to make the drawings or the detailed descriptions thereof clear. The lens 113 may be used as a focusing lens. For example, the lens assembly 101 may adjust a focal distance according to the distance to a subject while performing a forward/backward movement along the optical axis direction O of the optical device 100a. According to various embodiments, the lens 113 may be used as a lens for a zoom-in/zoom-out operation.

In order to guide the forward/backward movement of the lens assembly 101, the optical device 100a may further include one or more guide shafts 119. The guide shaft(s) 119 may be arranged to be parallel to, for example, the optical axis O of the lens 113, and may be coupled to penetrate the lens assembly 101 (e.g., the guide member 111). The guide member 111 and the guide shafts 119 may be slid in relation to each other. According to various embodiments, each of the guide shafts 119 may be disposed in the edge of the guide member 111. The guide shafts 119 may be made of a metal material, and at least the portions of the guide member 111, which rub with the guide shafts 119, may be made of a mechanically rigid and lubricated synthetic resin (e.g., an engineering plastic). For example, the lens assembly 101 may smoothly move forward/backward on the guide shaft 119.

The first driving device 102 may include a Voice Coil Motor (VCM) that is formed of, for example, a combination of a coil 121 and a magnetic body 123, which generate an electromagnetic force. The coil 121 is mounted on the guide member 111, and may form an electric field by receiving an electric signal. The coil 121 may form electric fields in different directions (e.g., forward or backward) depending on the electric signals that are applied thereto. The magnetic body 123 is arranged to face the coil 121, and the electric field, which is formed by the coil 121, may interact on the magnetic field, which is formed by the magnetic body 123, thereby generating a driving force (hereinafter, referred to as a "first driving force") that causes the guide member 111 (e.g., the lens assembly 101) to move forward and backward. Depending on the electric signal applied to the coil 121, the first driving force may cause the lens assembly 101 to move forward or backward. The first driving device 102 may further include a yoke 125 that concentrates the electromagnetic fields of the coil 121 and the magnetic body 123. The yoke 125 may have a closed loop shape, and the magnetic body 123 may be arranged to face a portion of the coil 121 within the yoke 125.

According to various embodiments, a plurality of first driving devices 102 may be disposed along the edge of the guide member 111. The first driving devices 102 may be arranged to be spaced apart from each other by a predetermined angular distance, and may be arranged to be symmetric to each other in the diametric direction of the guide member 111 or the lens 113. The arranged positions of the first driving devices 102 or the number of the first driving devices 102 may be properly designed in consideration of, for example, the intensity of the driving that may be generated by the first driving devices 102, and the size and weight of the lens assembly 101.

The second driving device 103 may include a VCM that is formed of, for example, a combination of a second coil 131 and a second magnetic body 133, which generate an electromagnetic force. The second coil 131 is mounted on the guide member 111, and may form an electric field by receiving an electric signal. The second coil 131 may form electric fields in different directions (e.g., forward or backward) depending on the electric signals that are applied thereto. The second magnetic body 133 is arranged to face the second coil 131, and the electric field, which is formed by the second coil 131, may interact on the magnetic field, which is formed by the second magnetic body 133, thereby generating a driving force (hereinafter, referred to as a "second driving force") that causes the guide member 111 (e.g., the lens assembly 101) to move forward and backward. Depending on the electric signal applied to the second coil 131, the second driving force may cause the lens assembly 101 to move forward or backward. The second driving device 103 may further include a second yoke 135 that concentrates the electromagnetic fields of the second coil 131 and the second magnetic body 133. The second yoke 135 may have a closed loop shape, and the second magnetic body 133 may be arranged to face a portion of the second coil 131 within the second yoke 135.

The second driving device 103 may be disposed at the edge of the guide member 111, and may be positioned at the same distance from each of the first driving devices 102. According to various embodiments, a plurality of second driving devices 103 may be disposed along the edge of the guide member 111. In arranging the plurality of second driving devices 103, the second driving devices 103 may be arranged to be symmetric to each other in the diametric direction of the guide member 111 or the lens 113.

The second driving devices 103 may generate the second driving force that acts in a direction that is opposite to that of the first driving force. For example, when the lens assembly 101 moves forward by the first driving force, the second driving force may act in the direction of making the lens assembly 101 move backward. In addition, when the lens assembly 101 moves backward by the first driving force, the second driving force may act in the direction of making the lens assembly 101 move forward. For example, when the coils 121 and 131 of the first and second driving devices 102 and 103 are wound in the same direction, current signals, which are applied to the first and second driving devices 102 and 103, may be applied in the opposite directions in relation to each other.

The second driving force may be generated to be equal to the first driving force or to be smaller than the first driving force. For example, while the second driving force may act as a driving force that drives the lens assembly 101 or changes the advancing direction, in the present embodiment, the driving force may act in the direction that is opposite to the moving direction of the lens assembly 101, thereby acting as a force of decelerating or stopping the lens assembly 101. Accordingly, the second driving force may act on the lens assembly 101 when the lens assembly 101 moves forward or backward by the first driving force.

In addition, when the lens assembly 101 moves to a target point (a focusing position according to the distance to the subject), the lens assembly 101 reciprocates forward and backward from the target point. During this movement, the second driving force may reduce the amplitude of the reciprocating movement of the lens assembly 101. As described above, the lens assembly 101 performs the forward/backward movement while being guided by the guide shafts 119. In addition, since the frictional force between the lens assembly 101 and the guide shafts 119 is small, the lens assembly 101 may further move by a distance by the inertia after starting to move even if the first driving force does not act. When the lens assembly 101 moves from a position adjacent to the target point or from the target point, the second driving force may act in the direction that is opposite to the moving direction of the lens assembly 101, thereby decelerating or stopping the lens assembly 101. The lens assembly 101 converges on the target point while reciprocating before and after the target point, and since the second driving force acts, the time that is required for stopping the lens assembly 101 at the target point can be reduced. For example, in the automatic focusing structure that uses the electromagnetic force of, for example, a voice coil motor, the time that is required for focusing can be reduced.

The action of the second driving force as described above will be described in more detail with reference to FIGS. 9 to 11.

Figure 3:
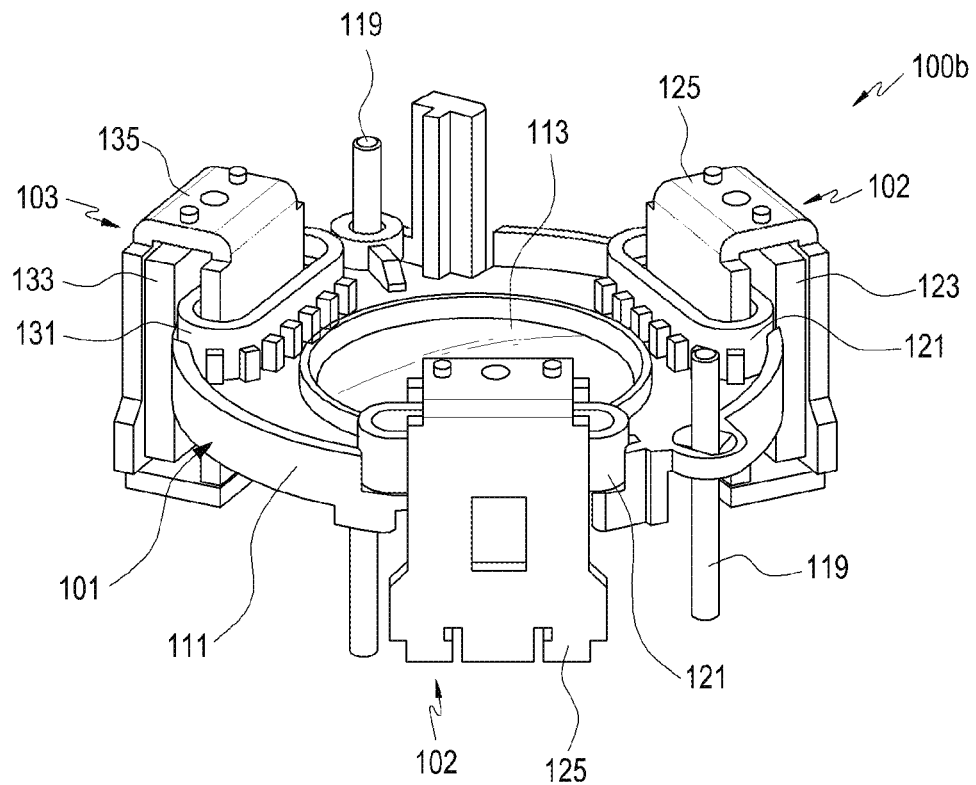
FIG. 3 is a perspective view illustrating a main portion of an optical device according to a second one of various embodiments of the present disclosure.
Figure 4:
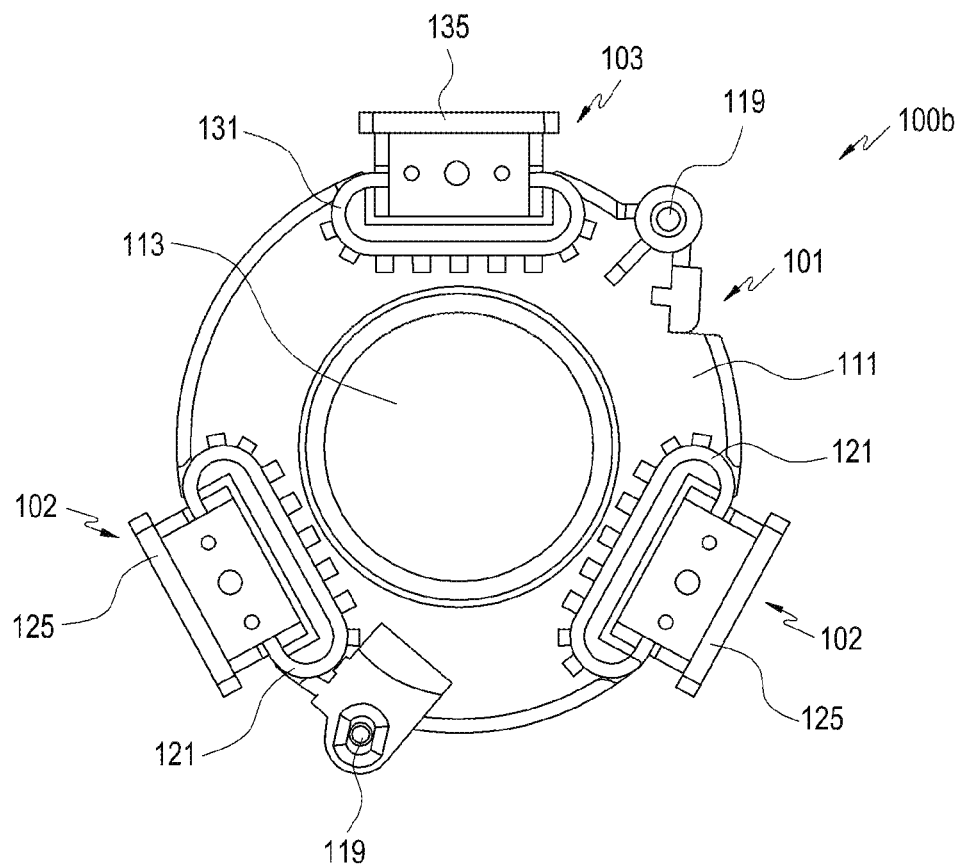
FIG. 4 is a plan view illustrating the main portion of the optical device according to the second one of various embodiments of the present disclosure.

FIG. 3 is a perspective view illustrating a main portion of an optical device 100*b* according to a second one of various embodiments of the present disclosure. FIG. 4 is a plan view illustrating the main portion of the optical device 100*b* according to the second one of various embodiments of the present disclosure.

Referring to FIGS. 3 and 4, as compared to the optical device 100*a* of the preceding embodiment, the optical device 100*b* may include the first and second driving devices 102 and 103 at different positions. For example, the first and second driving devices 102 and 103 may be arranged to be spaced apart from each other at predetermined angular intervals along the circumferential direction of the guide member 111. Since the structures of the first and second driving devices 102 and 103 may be implemented to be similar to those of the preceding embodiment, the detailed descriptions thereof will be omitted. As illustrated in FIGS. 3 and 4, the arrangement of the first and second driving devices 102 and 103 may be variously changed, and may be determined in consideration of, for example, the balance with the weight of the lens assembly 101 and the driving forces of the first and second driving devices 102 and 103.

Various embodiments related to the arrangement and the number of the first and second driving devices 102 and 103 are illustrated in FIGS. 5 to 8.

Figure 5:
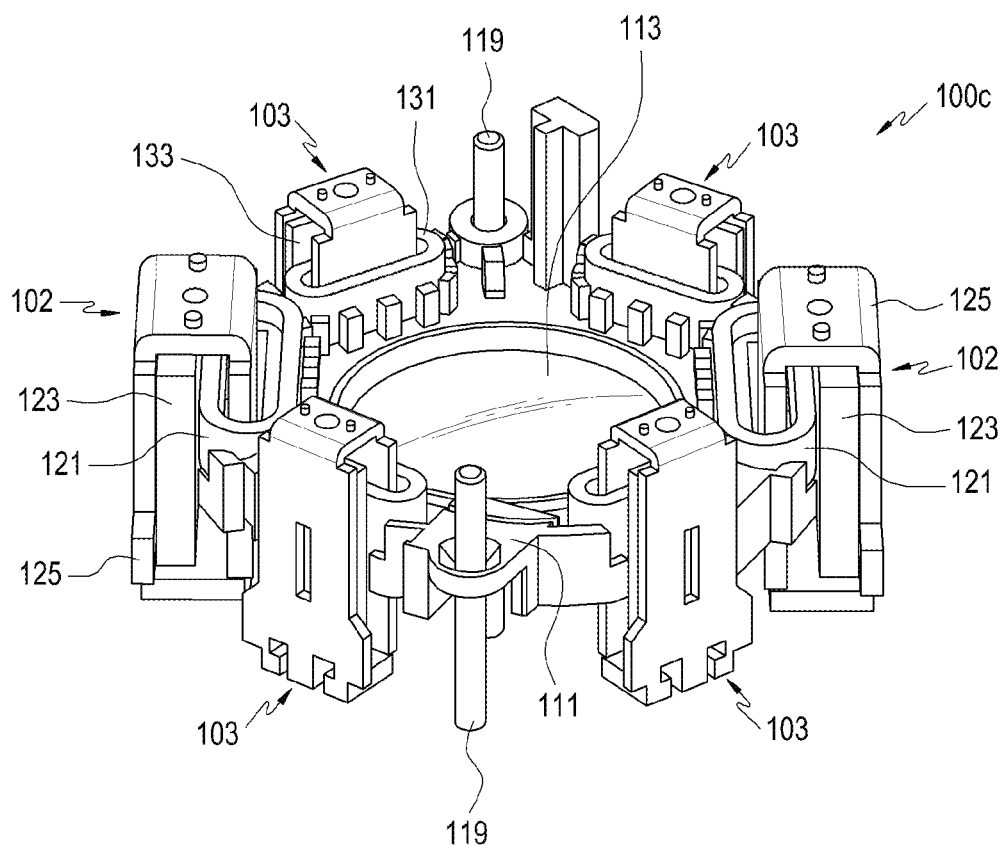
FIG. 5 is a perspective view illustrating a main portion of an optical device according to a third one of various embodiments of the present disclosure.
Figure 6:
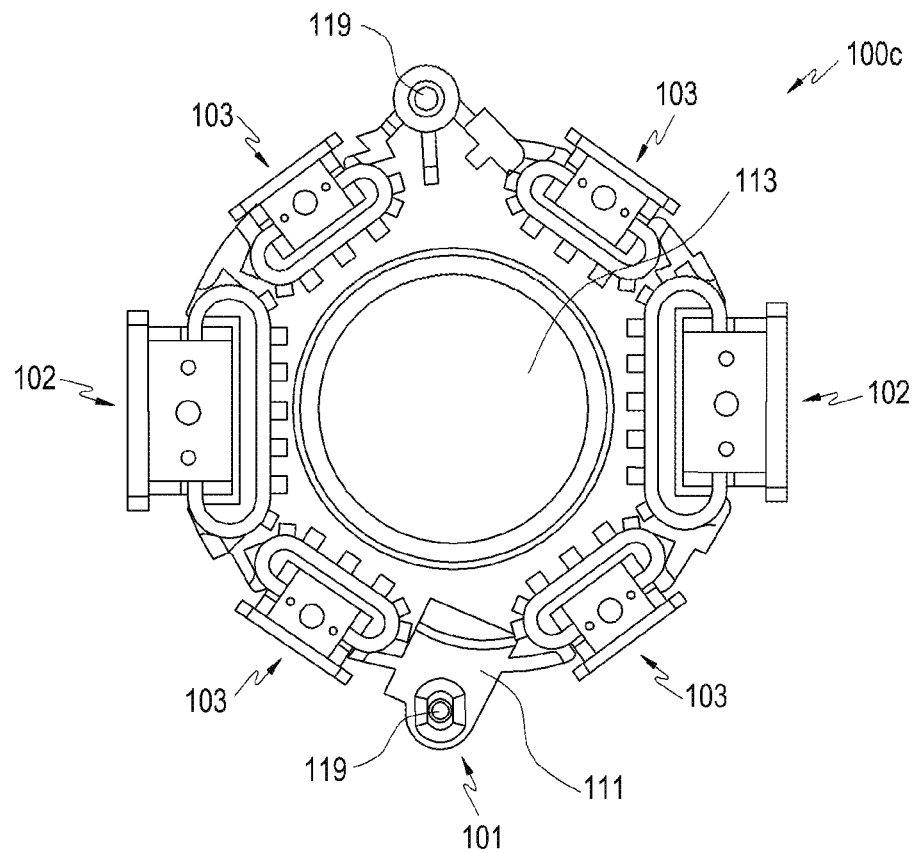
FIG. 6 is a plan view illustrating the main portion of the optical device according to the third one of various embodiments of the present disclosure.
Figure 7:
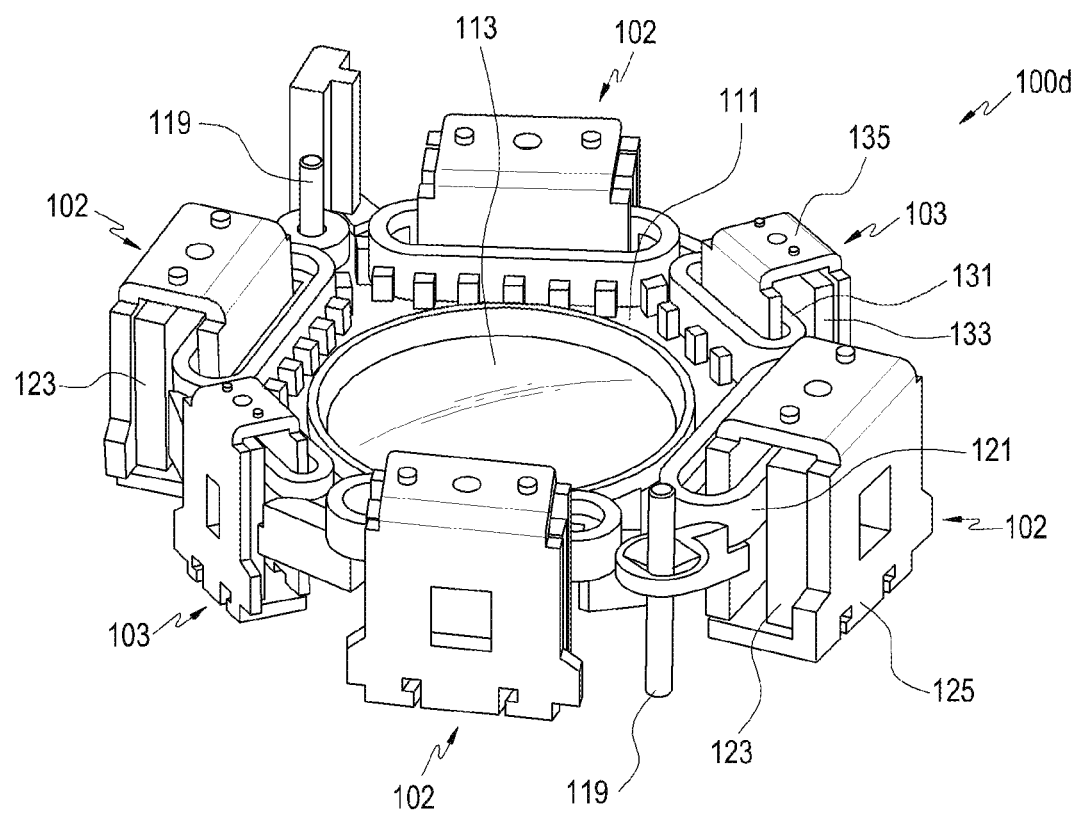
FIG. 7 is a perspective view illustrating a main portion of an optical device according to a fourth one of various embodiments of the present disclosure.
Figure 8:
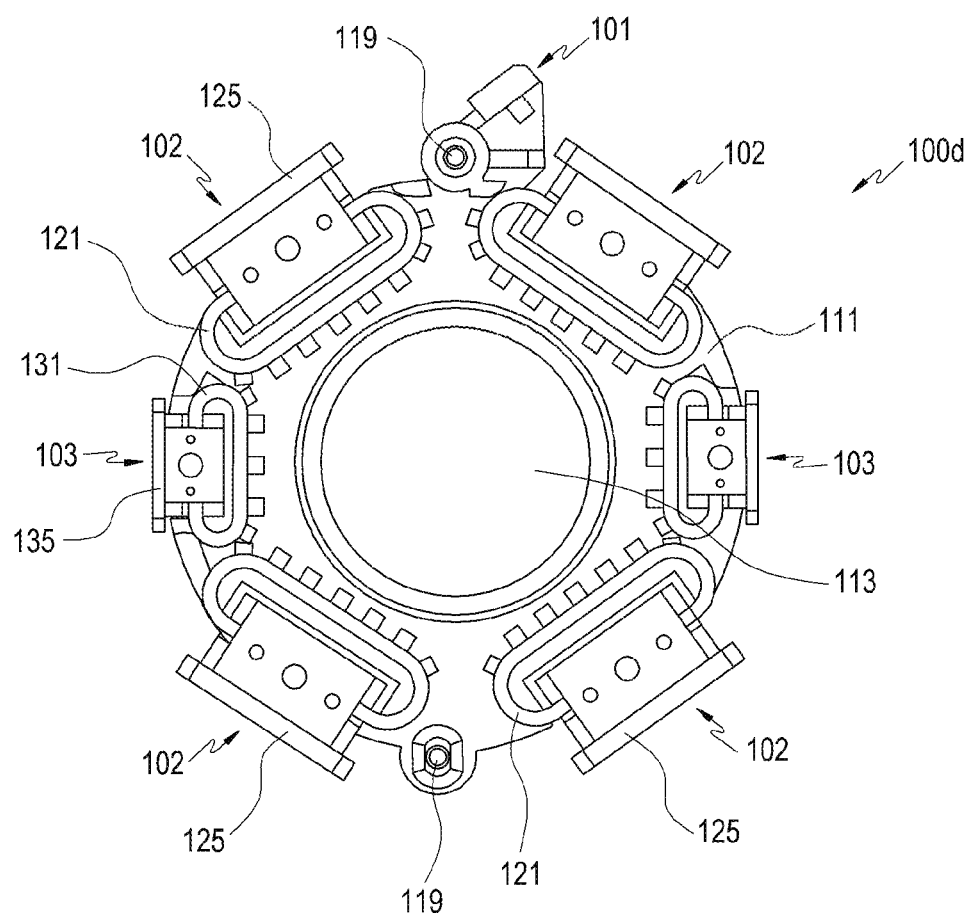
FIG. 8 is a plan view illustrating the main portion of the optical device according to the fourth one of various embodiments of the present disclosure.

FIG. 5 is a perspective view illustrating a main portion of an optical device 100*c* according to a third one of various embodiments of the present disclosure. FIG. 6 is a plan view illustrating the main portion of the optical device 100*c* according to the third one of various embodiments of the present disclosure. FIG. 7 is a perspective view illustrating a main portion of an optical device 100*d* according to a fourth one of various embodiments of the present disclosure. FIG. 8 is a plan view illustrating the main portion of the optical device 100*d* according to the fourth one of various embodiments of the present disclosure.

Referring to FIGS. 5 and 6, the drawings exemplify a structure of the optical device 100*c* in which two pairs of first driving devices 102 are arranged to be symmetric to each other, and one pair of second driving devices 103 are arranged to be symmetric to each other. Referring to FIGS. 7 and 8, the drawings exemplify a structure of the optical device 100*d* in which one pair of first driving devices 102 are arranged to be symmetric to each other, and two pairs of second driving devices 103 are arranged to be symmetric to each other. As described above, in consideration of, for example, the balance with the weight of the lens assembly 101 and the driving forces of the first and second driving devices 102 and 103, the arrangement and the number of the first and second driving devices 102 and 103 may be variously designed to be suitable for the above-mentioned factors.

Figure 9:
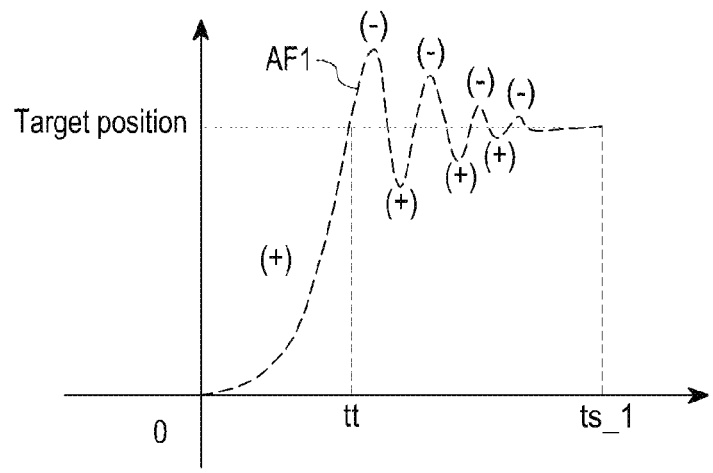
FIGS. 9 to 11 are views for describing focusing operations of optical devices according to various embodiments of the present disclosure, respectively.
Figure 10:
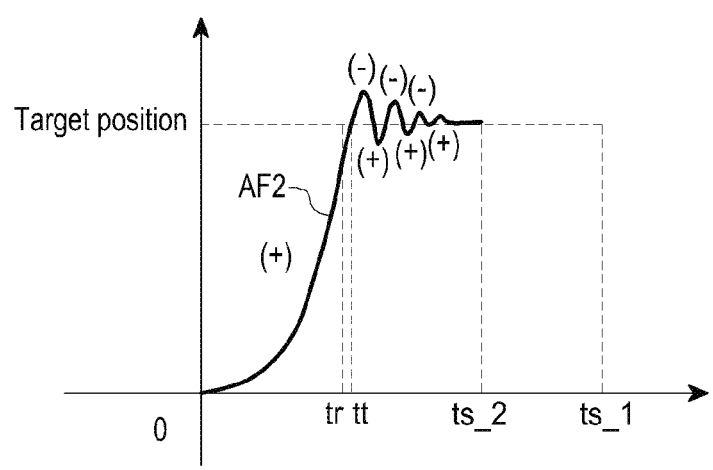
Figure 11:
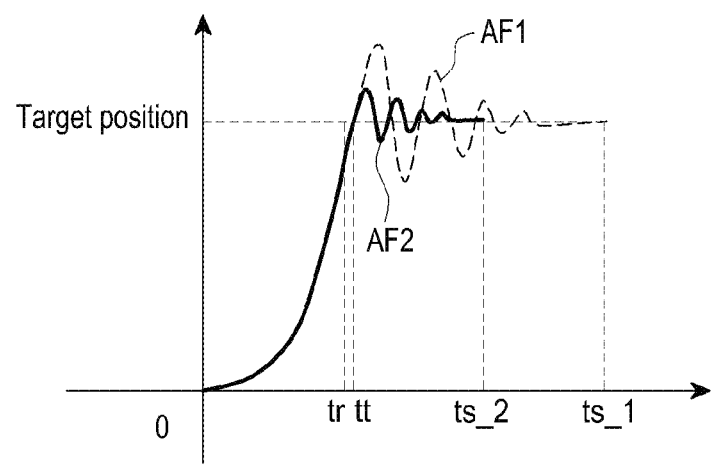

FIGS. 9 to 11 are views for describing the focusing operations of the optical devices 100*a*, 100*b*, 100*c*, and 100*d* (hereinafter, "100*a*" is denoted as a reference numeral) according to various embodiments of the present disclosure, respectively.

In order to make the descriptions clear, descriptions will be made as an example, assuming that the first driving device 102 is configured to generate a driving force that acts in the direction that causes the lens assembly 101 to move forward at the portions indicated by "(+)" in FIGS. 9 and 10, and the first driving device 102 is configured to generate a driving force that acts in the direction that causes the lens assembly 101 to move backward at the portions indicated by "(−)" in FIGS. 9 and 10. In addition, "Target position" may indicate a position (hereinafter, referred to as a "target point") that the lens assembly 101 should reach for focusing, "tt" may indicate a time point at which the lens assembly 101 initially passes through the target point, "tr" may indicate a time point at which the second driving device 103 is driven, "ts_1" may indicate a time point at which only the first driving device 102 is driven to stop the lens assembly 101 at the target point, and "ts_2" may indicate a time point at which both the first and second driving devices 102 and 103 are driven to stop the lens assembly 101 at the target point.

FIG. 9 is a graph that represents the movement (AF1) of the lens assembly 101 when the focusing operation is performed only with the first driving device 102 without driving the second driving device 103. FIG. 10 is a graph that represents the movement (AF2) of the lens assembly 101 when the focusing operation is performed by operating the first and second driving devices 102 and 103. FIG. 11 is a graph that illustrates the movements (AF1, AF2) of the lens assembly 101, which are illustrated in FIGS. 9 and 10, in comparison.

As illustrated in FIGS. 9 and 10, when the lens assembly 101 passes through the target point in moving the lens assembly 101 by driving the first driving device 102, the first driving device 102 may generate a driving force that acts in a direction that is opposite to the advancing direction of the lens assembly 101. This is enabled by changing the flowing direction of the current that is applied to the first driving device. Since the optical device 100*a* does not have a separate stopping means, the lens assembly 101 may move by a predetermined distance by the inertia in the moving direction even if the driving of the first driving device 102 is stopped, before the second driving device 103 is operated. Accordingly, when the lens assembly gets out of the target point, the first driving device 102 may be driven in the direction that is opposite to the moving direction of the lens assembly 101. By repeating such a process, the lens assembly 101 may converge to the target point while performing a reciprocating movement.

As the lens assembly 101 repeats the forward movement and the backward movement, the changing of the direction of the driving device that is generated by the first driving device 102 may be performed in a little more rapid cycle. As the lens assembly 101 repeats the forward movement and the backward movement and further, as the cycle of changing the direction of the driving force of the first driving device 102 becomes more rapid, the amplitude of the reciprocating movement of the lens assembly 101 from the target point may be gradually reduced. However, due to the inertia of the lens assembly 101, there may be a limit in reducing the time for stopping the lens assembly 101 at the target point 101 (e.g., the focusing time) only by changing the direction of the first driving force.

As described above, it may be understood that the lens assembly 101 moves by the first driving force, and as the direction of the first driving force is changed, the lens assembly 101 reciprocates before and after the target point. Before the second driving device 103 is driven, for example, according to the graph illustrated in FIG. 9, the reciprocating cycle and amplitude of the lens assembly 101 may be formed depending on the first driving force and the acting direction thereof. According to the graphs illustrated in FIGS. 10 and 11, it can be seen that the moving speed of the lens assembly 101 is reduced from the time point at which the second driving device 103 is driven, and the reciprocating amplitude of the lens assembly 101 is also reduced. Accordingly, compared to the time that is required for focusing only with the first driving device 102, the time that is required for focusing can be reduced when the second driving device 103 is driven together with the first driving device 102.

In this way, the second driving device 103 may generate a driving device that is equal to or smaller than that of the first driving device 102, and while the lens assembly 101 is moving or while the first driving device 102 is being operated, the second driving device 103 may be driven to decelerate the lens assembly 101 or may reduce the reciprocating amplitude of the lens assembly 101. Accordingly, the optical device(s) 100a is able to reduce the time that is required for the focusing operation.

As described above, according to various embodiments of the present disclosure, an optical device may include: a lens assembly that performs a forward/backward movement in an optical axis direction; at least one first driving device that generates a driving force (hereinafter, referred to as a "first driving force") that causes the lens assembly to perform the forward/backward movement in the optical axis direction; and at least one second driving device that generates a driving force (hereinafter, referred to as a "second driving force") in a direction that is opposite to the moving direction of the lens assembly. The second driving force may be equal to or smaller than the first driving force.

According to various embodiments, each of the first and second driving devices may be constituted with a Voice Coil Motor (VCM).

According to various embodiments, the second driving device may be operated when the lens assembly performs the forward/backward movement by the first driving force.

According to various embodiments, one pair of first driving devices may be arranged to be symmetric to each other in a diametric direction of the lens assembly.

According to various embodiments, the second driving device is disposed at the same angular distance from each of the first driving devices.

According to various embodiments, a plurality of first driving devices may be arranged to be symmetric to each other, and a plurality of second driving devices may be arranged to be symmetric to each other.

According to various embodiments, the optical device may further include a guide shaft that is arranged to be parallel to the optical axis direction, and the guide shaft may be coupled to penetrate the lens assembly to guide the forward/backward movement of the lens assembly.

According to various embodiments, the lens assembly may slide in the optical axis direction by being guided by the guide shaft.

According to various embodiments, one pair of guide shafts may each be coupled to penetrate the lens assembly.

According to various embodiments, when the first driving device drives and moves the lens assembly to a first point, the lens assembly, when reaching the first point, may gradually converge to the first point while reciprocating in forward and backward directions of the first point, and the second driving device may generate the driving force in a direction that is opposite to the moving direction of the lens assembly to reduce a reciprocating amplitude of the lens assembly.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An optical device comprising:
    a lens assembly performing a forward/backward movement in an optical axis direction;
    at least one first voice coil motor generating a first driving force that causes the lens assembly to perform the forward/backward movement in the optical axis direction; and
    at least one second voice coil motor generating a second driving force equal to or smaller than the first driving force in a direction that is opposite to a moving direction of the lens assembly,
    wherein when the lens assembly reciprocates forward and backward around a target point to converge to the target point, the at least one second voice coil motor generates the second driving force to reduce an amplitude of the reciprocation of the lens assembly.

2. The optical device of claim 1, wherein the at least one first voice coil motor comprises one pair of first voice coil motors, and the one pair of first voice coil motors are arranged to be symmetric to each other in a diametric direction of the lens assembly.

3. The optical device of claim 2, wherein the at least one second voice coil motor is disposed at a same angular distance from each of the pair of first voice coil motors.

4. The optical device of claim 1, wherein the at least one first voice coil motor comprises a plurality of first voice coil motors, the at least one second voice coil motor comprises a plurality of second voice coil motors, the plurality of first voice coil motors are arranged to be symmetric to each other, and the plurality of second voice coil motors are arranged to be symmetric to each other.

5. The optical device of claim 1, further comprising:
    at least one guide shaft arranged to be parallel to the optical axis direction,
    wherein the guide shaft is coupled to penetrate the lens assembly to guide the forward/backward movement of the lens assembly.

6. The optical device of claim 5, wherein the lens assembly slides in the optical axis direction while being guided by the guide shaft.

7. The optical device of claim 5, wherein the at least one guide shaft comprises one pair of guide shafts that are each coupled to penetrate the lens assembly.

8. A mobile communication terminal comprising:
 a camera module comprising an optical device, the optical device comprising:
  a lens assembly performing a forward/backward movement in an optical axis direction;
  at least one first voice coil motor generating a first driving force that causes the lens assembly to perform the forward/backward movement in the optical axis direction; and
  at least one second voice coil motor generating a second driving force equal to or smaller than the first driving force in a direction that is opposite to a moving direction of the lens assembly,
  wherein when the lens assembly reciprocates forward and backward around a target point to converge to the target point, second voice coil motor generates the second driving force to reduce an amplitude of the reciprocation of the lens assembly.

9. The mobile communication terminal of claim 8, wherein the at least one first voice coil motor comprises one pair of first voice coil motors, and the one pair of first voice coil motors are arranged to be symmetric to each other in a diametric direction of the lens assembly.

10. The mobile communication terminal of claim 9, wherein the second voice coil motor is disposed at a same angular distance from each of the pair of first voice coil motors.

11. The mobile communication terminal of claim 8, wherein the at least one first voice coil motor comprises a plurality of first voice coil motors, the at least one second voice coil motor comprises a plurality of second voice coil motors, the plurality of first voice coil motors are arranged to be symmetric to each other, and the plurality of second voice coil motors are arranged to be symmetric to each other.

12. The mobile communication terminal of claim 8, wherein the optical device further comprises:
 at least one guide shaft arranged to be parallel to the optical axis direction,
 wherein the guide shaft is coupled to penetrate the lens assembly to guide the forward/backward movement of the lens assembly.

13. The mobile communication terminal of claim 12, wherein the lens assembly slides in the optical axis direction while being guided by the guide shaft.

14. The mobile communication terminal of claim 12, wherein the at least one guide shaft comprises one pair of guide shafts that are each coupled to penetrate the lens assembly.

* * * * *